United States Patent [19]

Bollman

[11] 4,174,482
[45] Nov. 13, 1979

[54] FOUNDATION FRAME FOR AN INTERNAL COMBUSTION ENGINE AND ELECTRICAL GENERATOR SET

[75] Inventor: Edwin Bollman, Winterthur, Switzerland

[73] Assignee: Sulzer Brothers Limited, Winterthur, Switzerland

[21] Appl. No.: 848,643

[22] Filed: Nov. 4, 1977

[30] Foreign Application Priority Data

Nov. 16, 1976 [CH] Switzerland .................. 14380/76

[51] Int. Cl.² .................... F16M 5/00; F16M 9/00
[52] U.S. Cl. ................................ 290/1 A; 248/678; 248/679
[58] Field of Search ............... 248/2, 19, 346; 290/1 A, 52; 184/6

[56] References Cited

U.S. PATENT DOCUMENTS

| 1,380,123 | 5/1921 | Sullivan | 290/1 A |
| 1,459,563 | 6/1923 | Thamm | 290/1 A |
| 1,522,612 | 1/1925 | Burchett | 290/1 A |
| 1,716,132 | 6/1929 | Hodgkinson | 248/19 X |
| 2,395,415 | 2/1946 | Maier | 248/19 X |
| 2,568,783 | 9/1951 | Woodruff | 248/19 X |
| 3,418,485 | 12/1968 | Anderson et al. | 290/52 X |
| 3,742,241 | 6/1973 | Gate et al. | 290/52 |
| 3,910,381 | 10/1975 | Csanedy et al. | 290/52 X |

Primary Examiner—David H. Brown
Attorney, Agent, or Firm—Kenyon & Kenyon

[57] ABSTRACT

The foundation frame is formed of a pair of parallel tubes which are interconnected by cross-tubes and stiffeners. In addition, the frame has a pair of plates secured to and in parallel to the parallel tubes in order to receive the base of a combustion engine and the base of an electrical generator. The foundation frame may be secured to the hull of a ship or to a concrete base of a stationary plant.

12 Claims, 3 Drawing Figures

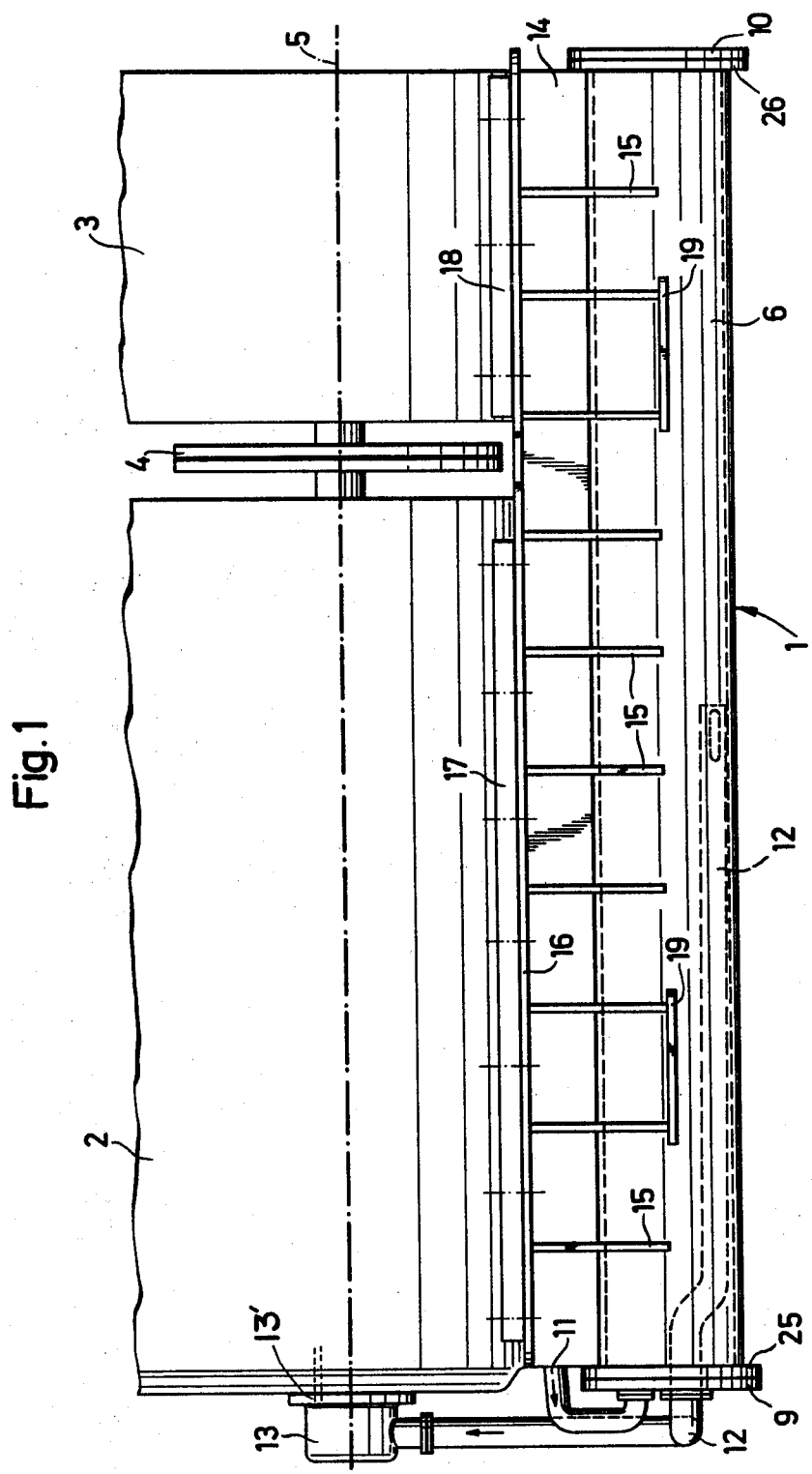

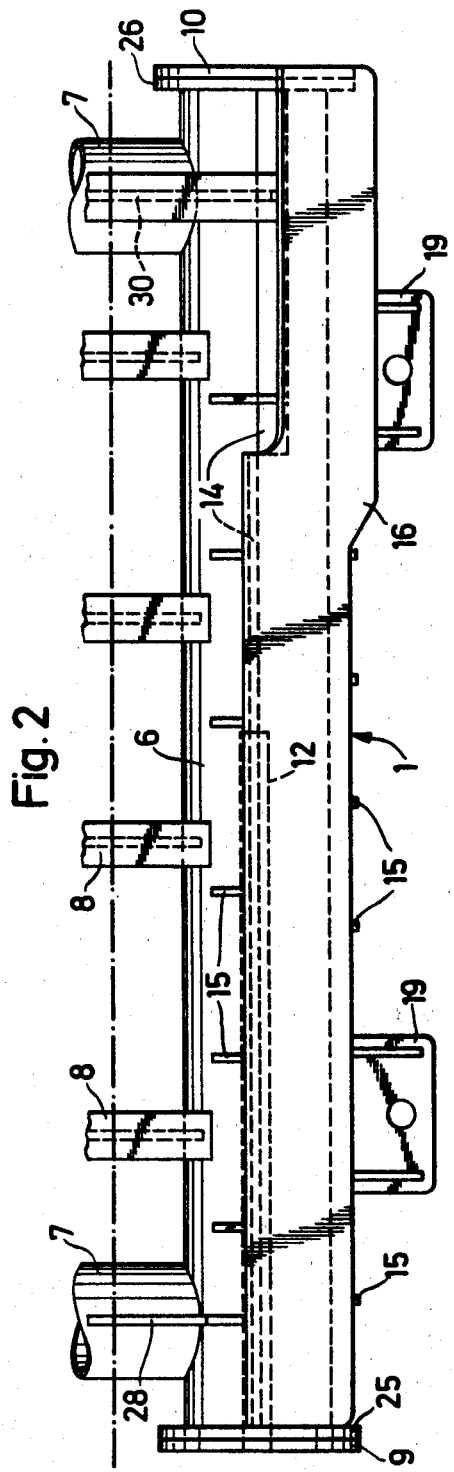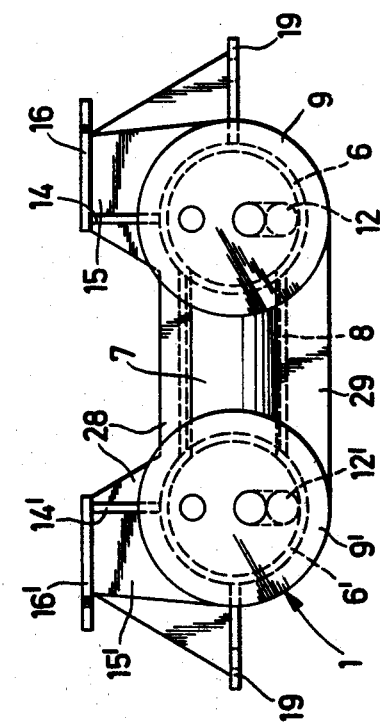

FOUNDATION FRAME FOR AN INTERNAL COMBUSTION ENGINE AND ELECTRICAL GENERATOR SET

This invention relates to a foundation frame and more particularly to a foundation frame for an internal combustion engine and electrical generator set. Still more particularly, this invention relates to a foundation frame for an internal combustion engine and electrical generator set for marine use.

As is known, foundation frames which have been used to mount engine and generator sets are generally rectangular in plan view. Usually, these frames have been formed of section steel members of different cross sections and dimensions which are welded together in order to form an integrated unit. However, these frames have been relatively expensive to produce because of the large number of weld seams required as well as the difficulty in obtaining access to the various seams to be welded. In addition, during operation, the base of the engine and the underside of the frames have generally been subjected to different heat expansions. As a result, there is a likelihood of additional stresses and distortions arising. Still further, the cost of such frames have been relatively high since a tank for liquid lubricant for the engine and generator must be fitted to the frames or a special place must be provided for the tank near the frame.

Accordingly, it is an object of the invention to provide a foundation frame for an internal combustion engine and electrical generator set which is of relatively inexpensive construction.

It is another object of the invention to reduce the cost of providing foundation frames for engine and generator sets.

It is another object of the invention to provide a foundation frame which requires but a limited number of welded seams.

It is another object of the invention to provide a foundation frame which is particularly useful for marine use.

Briefly, the invention provides a foundation frame which is comprised of a pair of parallel tubes each of which defines a reservoir for receiving a liquid lubricant and a pair of plates, each of which is secured to a respective tube to form a platform to receive an engine-generator set.

The parallel tubes are rigidly interconnected to each other as well as to the plates via a plurality of stiffeners which extend transversely of the tubes. In addition, at least one cross-tube is interconnected to and between the parallel tubes. This cross-tube not only rigidifies the connection between the parallel tubes but is also disposed to equalize the level of liquid lubricant in the parallel tubes.

The foundation frame is particularly useful in mounting a set formed of an internal combustion engine and an electrical generator. To this end, the base of the combustion engine and the base of the generator are received on the plates of the foundation frame. In addition, removable covers are disposed at each end of the parallel tubes and are adapted for the recirculation of lubricant between the tubes and the engine and generator of the set. For this purpose, a lubricant return line is connected between and to at least one of the covers and at least one of the engine and generator. In addition, a circulating pump is provided with an intake line connected to at least one of the covers to withdraw lubricant and an outlet to deliver the lubricant to at least one of the engine and generator. This intake line terminates within and near a bottom and longitudinal center of one of the parallel tubes.

The use of two parallel tubes considerably simplifies the welding required to secure the various components of the frame together. Also, considerably less material is used for the frame since the moment of inertia for tubes at a given frame weight is much higher than for section steel frames. In this regard, relatively thin-walled tubes can be used for the same moment of inertia.

Because the parallel tubes also serve as reservoirs for the liquid lubricant, less overall space is required. Further, during operation, there is no appreciable difference in heat expansion between the foundation frame and the engine/generator set since the lubricant is able to heat the foundation frame over the whole length of the set substantially to the same temperature as the base of the engine. Thus, higher stresses and resulting distortions of the frame are obviated.

Since the covers on the ends of the tubes are removable, the parallel tubes can be made readily accessible for cleaning and/or inspection.

For marine use, the intake line of the circulating pump terminates near the bottom and substantially at the longitudinal center of one of the parallel tubes. This insures that the circulating pump can always continue to intake lubricant during the pitching and rolling of the ship.

These and other objects and advantages of the invention will become more apparent from the following detailed description and appended claims taken in conjunction with the accompanying drawings in which:

FIG. 1 illustrates a diagrammatic and sectioned view of a foundation frame supporting an engine/generator set in accordance with the invention;

FIG. 2 illustrates a plan view of one half of the foundation frame of FIG. 1; and FIG. 3 illustrates an end view of the foundation frame taken from the engine end.

Referring to FIG. 1, the foundation frame 1 supports a machine set comprised of a diesel engine 2 and an electric generator 3. As shown, the engine 2 and generator 3 are drivingly connected to one another by way of a coupling 4.

The foundation frame 1 is constructed of a pair of parallel tubes 6, 6' of round cross section which extend along a longitudinal axis 5 of the machine set. These tubes 6, 6' are rigidly interconnected by a pair of cross-tubes 7 which are disposed near the ends of the parallel tubes 6, 6' and by a number of I-section bars 8 which are distributed over the space between the cross-tubes 7 and extend transversely of the tubes 6, 6'. The axes of all of the tubes 6, 6', 7 and the longitudinal axes of the bars 8 are all at the same level. In addition, the cross-tubes 7 are of smaller diameter than the tubes 6, 6'.

The foundation frame 1 also has a plurality of stiffeners 28, 29 which extend transversely of the parallel tubes 6, 6'. These stiffeners 28, 29 are welded in the vertical plane of the cross-tube 7 located under the engine 2 (see FIG. 2) in order to further stiffen the connection between the parallel tubes 6, 6'. In a corresponding manner, a flange stiffener 30 is welded to the top of the cross-tube 7 under the generator 3 (see FIG. 2) in the vertical plane of the cross-tube 7 and a stiffener (not shown) similar to the stiffener 29 is welded to the bottom of the cross-tube 7.

The parallel tubes 6, 6' each define a reservoir for receiving a liquid lubricant which is circulated in the engine 2 and in the bearings (not shown) of the generator 3. The hollow interiors of the tubes 6, 6' are further interconnected via the cross-tubes 7. Consequently, the cross-tubes 7 not only provide an additional rigid connection between the tubes 6, 6' but also serve to equalize the level of liquid lubricant in the parallel tubes 6, 6'.

Referring to FIGS. 1 and 3, removable covers 9, 9' close the ends of the tubes 6, 6' at the engine end and similar covers 10 close the ends of the tubes 6, 6' at the generator end. In order to secure the covers 9, 9', 10, the ends of the parallel tubes 6, 6' are provided with flanges 25, 26 to which the covers can be secured by bolts (not shown).

Referring to FIG. 1, a circulating pump 13 is also provided for circulating the lubricant. To this end, the pump 13 is flange connected to the engine 2 and has an intake line 12 connected to the cover 9 in order to withdraw lubricant from the tube 6. In addition, the pump 13 has a suitable outlet 13' to deliver the lubricant to lubrication stations (not shown) of the engine 2 and, unless a separate circulating pump is provided for the generator 3, to the generator 3 as well. As shown in FIG. 1, the intake line 12 extends into the hollow interior of the tube 6 and terminates near a bottom of the tube 6 substantially at the longitudinal center of the tube 6. As shown in FIG. 3, an intake line 12' can also be provided in the tube 6' and can be joined to the intake line 12 outside the covers 9, 9' so that the two tubes 6, 6' are connected in parallel relative to the flow of lubricant.

A pair of lubricant return lines 11, only one of which is shown in FIG. 1, extend from each of the two ends of an engine sump (not shown) and terminates in the cover 9 or 9' or 10 (FIG. 3). A corresponding return line (not shown) can also be provided for the lubricant flowing from the bearings of the generator 3 and terminate in the cover 10.

Referring to FIG. 3, axially extending stiffeners 14, 14' are welded to the tops of the respected tubes 6, 6'. Each of these stiffeners 14, 14' is vertically disposed near the engine 2 and is inclined outwardly near the generator 3 (FIG. 2). In addition, a plurality of cross-plates or stiffeners 15, 15' are provided on both sides of the stiffeners 14, 14'. These stiffeners 15, 15' are distributed over the length of the stiffeners 14, 14' and are welded thereto as well as to the tubes 6, 6'. Also, a pair of plates 16, 16' are each welded to the top end of the stiffeners 14, 14' and the cross stiffeners 15, 15'. As shown in FIG. 2, these plates 16, 16' extend lengthwise of the tubes 6, 6' so as to receive a base 17 of the engine 2 and a base 18 of the generator 3. In addition, the stiffeners 28–30 which are connected to the cross-tube 7 are also welded to the stiffeners 14, 14' and cross stiffeners 16, 16'. With the set assembled, the bases 17, 18 of the engine 2 and generator 3 are carried on the plates 16, 16'.

As shown, two brackets 19, 19' are welded to each tube 6, 6' and extend laterally outwards of the foundation frame. These brackets 19, 19' serve to secure the foundation frame 1 either in the hull of a ship, or in the case of a stationary plant, to a concrete base.

If the parallel tube 6, 6' are filled with liquid lubricant to an adequate level, good damping of possible vibrations is provided. Further, the round or cylindrical shape of the tubes 6, 6' greatly reduces the area in contact with the lubricant. Thus, there is little risk of corrosion. Further, the lubricant allows a very reduced area of the weld seams. The cylindrical shape of the tubes 6, 6' allows corrosion protection to be simply applied, for example in the form of a plastics coating since the tubes 6, 6' are devoid of corners and blends which would make the application of a coating difficult and which might allow a coating to detach from the tubes 6, 6'.

What is claimed is:

1. A foundation frame for an internal combustion engine and electrical generator set, said frame comprising
    a pair of parallel rigidly interconnected tubes of round cross-section, each said tube having closed ends to define a reservoir there between for receiving a liquid lubricant therein; and
    a pair of plates, each said plate being secured to and extending longitudinally of a respective one of said tubes to receive a base of the engine and a base of the generator.

2. A foundation frame as set forth in claim 1 which further comprises a plurality of stiffeners extending transversely of said tubes, said stiffeners being interconnected to said tubes and said plates.

3. A foundation frame as set forth in claim 1 which further comprises at least one cross-tube interconnected to and between said parallel tubes, said cross-tube being disposed to equalize the level of liquid lubricant in said parallel tubes.

4. A foundation frame as set forth in claim 1 which further comprises a cross-tube interconnected to and between said parallel tubes at each end of said parallel tubes.

5. A foundation frame as set forth in claim 1 which further comprises removable covers disposed at each end of each of said parallel tubes.

6. A foundation frame as set forth in claim 5 which further comprises a lubricant return line connected to at least one of said covers.

7. As set forth in claim 6 which further comprises an intake line of a circulating pump connected to at least one of said covers.

8. As set forth in claim 7 wherein said intake line terminates within and near a bottom and longitudinal center of one of said parallel tubes.

9. In combination with a set having an internal combustion engine having a base and an electrical generator having a base; a foundation frame for mounting said set, said foundation frame comprising a pair of parallel rigidly interconnected tubes of round cross-section, each said tube defining a reservoir for receiving a liquid lubricant therein, and a pair of plates, each said plate being secured to and extending longitudinally of a respective one of said tubes and receiving said base of said engine and said base of said generator thereon.

10. The combination as set forth in claim 9 which further comprises removable covers on each end of said tubes; a circulating pump having an intake line connected to at least one of said covers to withdraw lubricant from said tubes and an outlet to deliver the lubricant to at least one of said engine and generator; and a return line connected to and between at least one of said engine and said generator and at least one of said covers to return lubricant to said tubes.

11. A foundation frame comprising
    a pair of parallel tubes of round cross section each said tube defining a reservoir for receiving a liquid lubricant therein;

a pair of plates, each said plate being secured to and extending longitudinally of a respective one of said tubes;

a plurality of stiffeners extending transversely of said tubes, said stiffeners being interconnected to said tubes and said plates; and at least one cross-tube interconnected to an between said parallel tubes, said cross-tube being disposed to equalize the level of liquid lubricant in said parallel tubes.

12. In combination with a set having an internal combustion engine having a base and an electrical generator having a base; a foundation frame for mounting said set, said foundation frame comprising a pair of parallel rigidly interconnected tubes, each said tube having removable covers on each end to define a reservoir for receiving a liquid lubricant therein, and a pair of plates, each said plate being secured to and extending longitudinally of a respective one of said tubes and receiving said base of said engine and said base of said generator thereon; a circulating pump having an intake line connected to at least one of said covers to withdraw lubricant from said tubes and an outlet to deliver the lubricant to at least one of said engine and generator; and a return line connected to and between at least one of said engine and said generator and at least one of said covers to return lubricant to said tubes.

* * * * *

UNITED STATES PATENT AND TRADEMARK OFFICE
CERTIFICATE OF CORRECTION

PATENT NO. : 4,174,482

DATED : November 13, 1979

INVENTOR(S) : Edwin Bollman

It is certified that error appears in the above–identified patent and that said Letters Patent are hereby corrected as shown below:

Column 4, line 4, change "blends" to --bends--

Column 5, line 7, change "an" to --and--

Signed and Sealed this

Twenty-sixth Day of February 1980

[SEAL]

Attest:

SIDNEY A. DIAMOND

Attesting Officer     Commissioner of Patents and Trademarks